(12) United States Patent
Palacios Doñaque

(10) Patent No.: US 7,601,261 B2
(45) Date of Patent: Oct. 13, 2009

(54) SLUDGE FLOCCULATOR-SEPARATOR FOR THE PHYSICO-CHEMICAL TREATMENT OF WATER

(75) Inventor: Enric Palacios Doñaque, Barcelona (ES)

(73) Assignee: Acciona Agua, S.A.U., Madrid (ES)

( * ) Notice: Subject to any disclaimer, the term of this patent is extended or adjusted under 35 U.S.C. 154(b) by 579 days.

(21) Appl. No.: 11/344,520

(22) Filed: Jan. 31, 2006

(65) Prior Publication Data
US 2007/0175810 A1    Aug. 2, 2007

(51) Int. Cl.
*C02F 1/52* (2006.01)

(52) U.S. Cl. ............ 210/195.3; 210/205; 210/199; 210/203; 210/220

(58) Field of Classification Search .......... 210/205, 210/195.3, 199, 203, 220
See application file for complete search history.

(56) References Cited

U.S. PATENT DOCUMENTS

| | | | | |
|---|---|---|---|---|
| 4,927,543 A * | 5/1990 | Bablon et al. | ............... | 210/711 |
| 6,010,631 A * | 1/2000 | Delsalle et al. | ............. | 210/713 |
| 6,228,267 B1 * | 5/2001 | Yamasaki et al. | ........... | 210/615 |
| 6,423,228 B2 * | 7/2002 | Yamasaki et al. | ........... | 210/601 |
| 6,447,686 B1 * | 9/2002 | Choi et al. | ................. | 210/666 |
| 7,083,715 B2 * | 8/2006 | Binot | ........................ | 210/112 |

* cited by examiner

*Primary Examiner*—Duane Smith
*Assistant Examiner*—Douglas J Theisen
(74) *Attorney, Agent, or Firm*—Klauber & Jackson LLC

(57) ABSTRACT

The water to treat is received in a chamber (1) with a rapid mixer and from there it passes to a second chamber for coagulation (3) and from that to a third chamber for flocculation (4) where it is mixed with certain coagulating reagents. It then enters a separator (7) provided with some filtering membranes (5) where it is clarified. In the separator (7) there are some air nozzles (6) which sweep the surface of the said filtering membranes (5), some inlet nozzles (8) for floccules coming from the coagulation-flocculation and other air outlet nozzles (6) for distribution of said floccules underneath the membrane (5).

5 Claims, 1 Drawing Sheet

SLUDGE FLOCCULATOR-SEPARATOR FOR THE PHYSICO-CHEMICAL TREATMENT OF WATER

OBJECT OF THE INVENTION

As stated in the title of this specification, this invention concerns a sludge flocculator-separator for the physico-chemical treatment of water, providing notable relevant and advantageous characteristics compared to devices or apparatus currently used in facilities of this type.

The device or apparatus that we are concerned with is used in facilities for water treatment, whether it is water for industry that is being treated or water for drinking purposes.

It enables working at high speed in physico-chemical processes where coagulants such as ferric chloride, aluminium sulphate, etc., are used.

PRIOR ART OF THE INVENTION

In current systems for water treatment, a recipient is used for the rapid mixing with stirring of the coagulating reagents of the water, a flocculator with a stirring system and one or various settling or separation units.

In this type of facility, stirrers and scrapers need to be used in the separation zone in order to eliminate the sludge deposited in the tank.

Moreover, in order to optimise the quality of the treated water, it is necessary to use filters of sand, anthracite or prelayers with a diatomaceous base.

DESCRIPTION OF THE INVENTION

In general terms, the sludge flocculator-separator for the physico-chemical treatment of water, forming the object of the invention, comprises a rapid mixer, a coagulation chamber and a flocculation chamber for the mixing of the coagulating reagents. A separator is then provided where the water to treat arrives via a series of sludge distribution nozzles.

The flocculator-separator can function according to two principles depending on the characteristics of the floc formed:

Keep the sludge coming from the flocculation in a permanent state of suspension at speeds higher than those for the settling of the actual floccule that is formed.

Keep the floccule in a tranquilising zone below the air network, and carry out its concentration. The aeration on the membranes will be done intermittently according to the needs of the separation process.

The water is clarified by causing it to pass through a series of filtering membranes made of a non-absorbent material with a low clogging index, of cylindrical, tubular, plane or hollow fibre geometry.

The membranes are fitted in frames, maintaining a distance between them that permits a rate of sweeping of the filtration surface by the air greater than the rate of filtration through the membranes.

So that the water can filter through the membranes, a suction has to be maintained in order to overcome the resistance of the membranes and that offered by the viscous layer formed on top of them.

In this way, and by means of a special configuration of the membranes, one achieves treated water without any content of solids in suspension, and with low turbidity, making it suitable for being subjected to treatment with membranes in reverse osmosis processes.

With this system, it is estimated that the sand or anthracite filters, and in some cases even the prelayer filters, could be dispensed with, since, depending on the type of filtering membrane, high-quality waters could successfully be obtained at the outlet from the apparatus.

There exist some air inlet nozzles with which an effect of a current of air bubbles is produced for performing the sweeping on the surface of the membranes and a recirculation of the interior liquid contained in the apparatus, producing a continual cleaning effect on those filtering membranes.

In the separation body there also exists a sub-network of nozzles for air bubbles whose size can be regulated, beneath the distribution nozzles for the floccules so that, if so desired, these floccules are not deposited on the bottom of the separator; its use is optional.

The air inlet nozzles are required for producing a current of air and liquid in order to perform a sweeping on the surface of the filtering membranes. This sweeping allows the thickness of the cake of sediments or pasty product formed to be controlled, in such a way that an efficacy is achieved in the filtering of the membranes and at the same time they are prevented from becoming clogged.

The size of air bubble is regulated by means of the geometry of the nozzles with different bubble sizes being able to be achieved in order to provide an adequate system of turbulence on the surface of the membranes.

With this arrangement, the advantages which, in principle, can be listed, as are follows:

Due to optimisation of the size of the device or machine materialising the sludge flocculator-separator pursuant to the invention, the cost of civil work is very low.

Unlike conventional systems, it permits high surface work loads, thus reducing the size of the apparatus.

High quality of treated water.

It permits a high concentration of sludge in the separation zone, thus reducing the flow or number of ventings.

No scraping of the bottom is necessary.

Owing to the quality of the treated water, the sand or anthracite filters or prelayers, referred to earlier in relation to the current state of the art, can be dispensed with.

As required, multifiltration and ultrafiltration membranes of different geometries, cylindrical, tubular, plane or hollow fibre, can be used.

The filtering membranes can be washed by back-washing with filtered water obtained from the device itself, without any need to empty the separation zone where the membranes are housed, which saves on a quantity of water since it is introduced into the system again.

Due to the type of filtering material used in the plates, chemical products can be used for cleaning them if required.

Easy extraction of plates from the frames for their inspection, washing or replacement.

In order to facilitate an understanding of the characteristics of the invention and forming an integral part of this specification, a sheet is attached containing a single FIGURE in which, by way of illustration only and not limiting, the following has been represented.

DESCRIPTION OF THE PREFERRED MANNER OF EMBODIMENT

Figure 1:
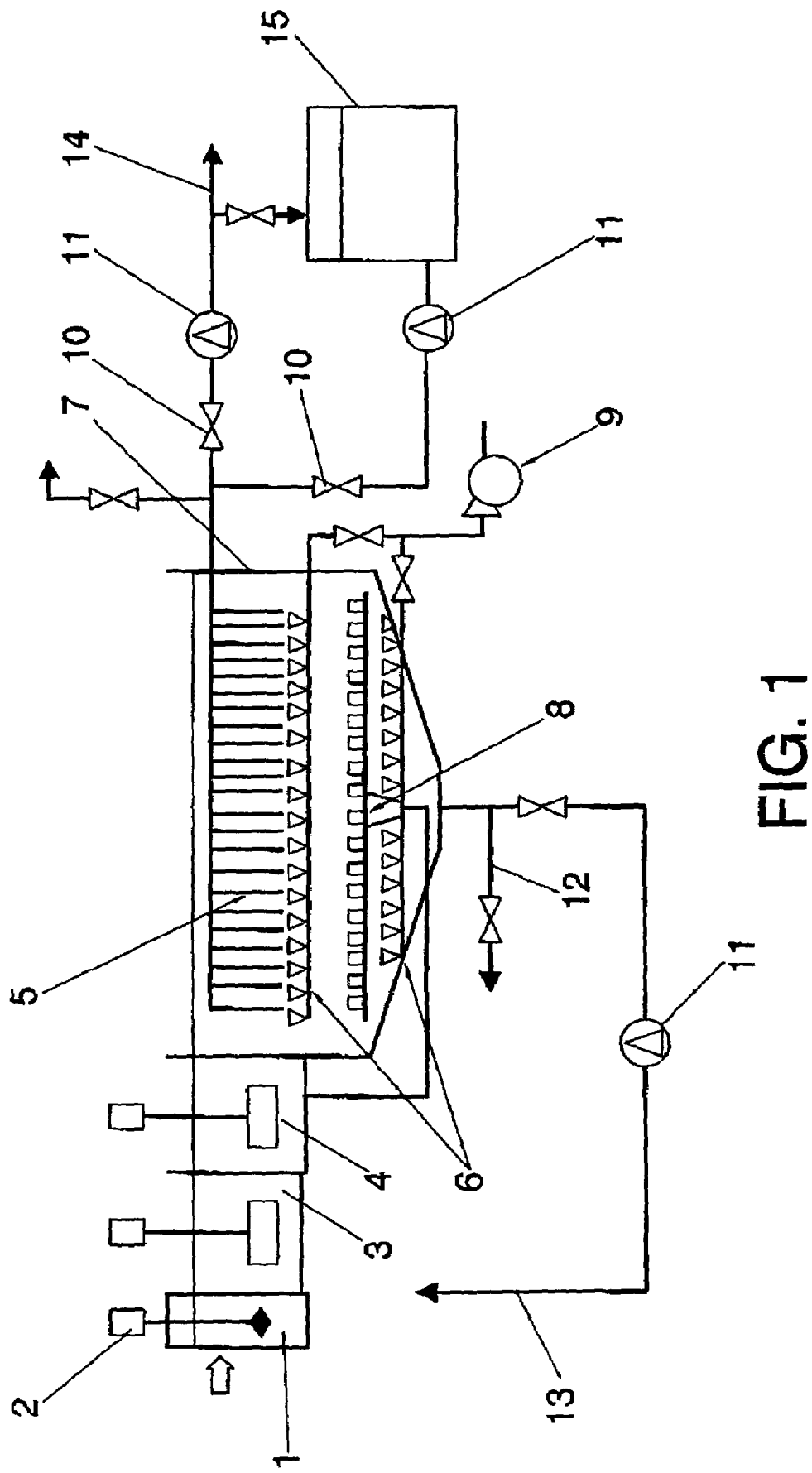
FIG. 1. Is a diagram of the sludge flocculator-separator for the physico-chemical treatment of water, forming the object of the invention.

Making reference to the numbering adopted in the FIGURE, we can see how the sludge flocculator-separator for the physico-chemical treatment of water, which the invention proposes, consists of a chamber 1 with a fast mixer 2, then passing to the contiguous coagulation chamber 3 and to the contiguous flocculation chamber 4, being duly mixed with the coagulating reagents.

The array of filtering membranes is referenced in general with the number 5 and beneath them are to be found the air distribution nozzles 6. There exist other air distribution nozzles forming a sub-network in the lower part of the actual separator 7, which are in turn located beneath the distribution nozzles for the floccules 8. The actual separator 7 is contiguous to the flocculation chamber 4.

The reference 9 designates a blower, reference 10 is for line valves and reference 11 for pumps used for suction, washing or recirculation of sludge, depending on their location.

The venting line for the sludge is referenced with the number 12, the sludge recirculation line has been referenced with 13 and that for the water suction with number 14. The sludge flocculator-separator also comprises a tank that has been referenced with the number 15.

For the entrance of floccules coming from the coagulation-flocculation, longitudinal nozzles are provided for their distribution, defining a network of nozzles which we have referenced with number 8. In this way, they are distributed as best as possible underneath the membranes 5 with the aim of preventing the rapid deposition of those floccules in the lower part of the separation chamber 7.

This sludge inlet network is located above the sub-network of air nozzles 6 with adjustable bubble size, which helps to provide an initial suspension of the floccules by launching them to a suitable height so that they can then be dragged towards the separator membranes by the air impulsion effect already mentioned.

With this arrangement, the functioning of the machine is as follows:

The water to treat arrives at the separator and specifically at the coagulation 3 and flocculation 4 chambers and is mixed with the coagulating reagents. From there it enters the actual separator 7, via the sludge distribution nozzles 8, where it is subjected to an ascending speed that permits the floccules formed to be maintained in suspension uninterruptedly.

When the level of the water in the separation chamber 7 reaches a defined height above the level of the filtering plates 5, then the valve 10 for the treated water installed in the filtered water collector 14 proceeds to be opened until the rated flow of the separator is achieved by means of the suction pump 11.

The sludge content of the separation zone increases until it reaches a predetermined value, depending on the water to treat and the type of sludge obtained. By means of venting of sludge by the line referenced with 12, the level of that sludge inside the separator 7 can be controlled.

Likewise, in order to optimise the quantity of reagents, one can proceed to establish a sludge recirculation flow according to the line referenced with 13, from the bottom of the separator 7 to the coagulation chamber 3.

The invention claimed is:

1. SLUDGE FLOCCULATOR-SEPARATOR FOR THE PHYSICO-CHEMICAL TREATMENT OF WATER, wherein it comprises a reception chamber (1) of the water to treat, with a rapid mixer (2), passing to a coagulation chamber (3) and to a chamber for flocculation (4), being mixed with coagulating reagents; provision having been made for another contiguous chamber which materialises the actual separator itself (7), where a series of filtering membranes (5) is to be found, where the water to treat is clarified as it passes through them; there existing some air inlet nozzles (6) which perform a sweep on the surface of said filtering membranes (5); and with provision furthermore having been made for some longitudinal nozzles (8) for the entrance and distribution of floccules, located beneath said filtering membranes (5).

2. SLUDGE FLOCCULATOR-SEPARATOR FOR THE PHYSICO-CHEMICAL TREATMENT OF WATER, according to claim 1, wherein the nozzles (8) for the distribution of the floccules define an inlet network located above a sub-network of nozzles (6) for air bubbles of adjustable size.

3. SLUDGE FLOCCULATOR-SEPARATOR FOR THE PHYSICO-CHEMICAL TREATMENT OF WATER, according to claim 1, wherein the filtering membranes (5) are of cylindrical, tubular, plane or hollow fibre geometry, and said sludge flocculator-separator also comprises a control valve (10), a suction pump (11), a collector (14) for filtered water and a tank (15).

4. SLUDGE FLOCCULATOR-SEPARATOR FOR THE PHYSICO-CHEMICAL TREATMENT OF WATER, according to claim 1, wherein there exists a sludge venting line (12) for controlling the level of sludge in the separation zone and another line for recirculation of sludge (13) from the lower part of the separator (7) to the coagulation chamber.

5. SLUDGE FLOCCULATOR-SEPARATOR FOR THE PHYSICO-CHEMICAL TREATMENT OF WATER, according to claim 1, wherein the filtering membranes (5) are made of non-absorbent material with a low clogging index, of cylindrical, tubular, plane or hollow fibre geometry, being fitted in frames and at a suitable distance.

* * * * *